United States Patent [19]

Huellwegen

[11] 4,297,595

[45] Oct. 27, 1981

[54] SIGNAL REGENERATING CIRCUIT WITH IMPROVED INPUT-OUTPUT ISOLATION

[75] Inventor: Josef Huellwegen, Altenbeken, Fed. Rep. of Germany

[73] Assignee: Nixdorf Computer AG, Paderborn, Fed. Rep. of Germany

[21] Appl. No.: 49,136

[22] Filed: Jun. 18, 1979

[30] Foreign Application Priority Data

Jun. 19, 1978 [DE] Fed. Rep. of Germany ....... 2826897

[51] Int. Cl.³ .............................................. H03K 5/01
[52] U.S. Cl. .................................. 307/268; 307/262; 328/164
[58] Field of Search ............... 307/241, 242, 243, 268, 307/262; 328/26, 34, 60, 32, 163, 164; 178/70 R, 70 T, 70 TS

[56] References Cited

U.S. PATENT DOCUMENTS

| | | | |
|---|---|---|---|
| 3,402,304 | 9/1968 | Burke | 328/164 X |
| 3,612,895 | 10/1971 | Niedra | 307/262 X |
| 3,737,585 | 6/1973 | Ghosh | 328/164 X |

FOREIGN PATENT DOCUMENTS 2411871  7/1975  Fed. Rep. of Germany .

*Primary Examiner*—John Zazworsky
*Attorney, Agent, or Firm*—Marianne Rich

[57] ABSTRACT

Digital signals are applied to an ungrounded transmission line through a two channel system, one channel being operative in response to a binary "1" the other in response to a binary "0." Each channel, when active, receives high frequency oscillations through a transformer. One side of the transformer is connected to the emitter-collector circuit of a transistor constituting a main rectifier. A buffer transistor has an emitter-collector circuit connected in series with the main rectifier transistor. A rectifier diode connected to the secondary winding of the transformer furnishes a DC signal to switch the buffer transistor to the conductive state only when high frequency oscillations appear across the secondary winding, that is when the channel is active. A high frequency filter between the main rectifier transistor and the buffer transistor prevents high frequency oscillations from reaching the output.

9 Claims, 2 Drawing Figures

SIGNAL REGENERATING CIRCUIT WITH IMPROVED INPUT-OUTPUT ISOLATION

The present invention relates to signal regenerating circuits and, in particular, to those circuits wherein signals are transmitted over ungrounded transmission lines. The transmission lines are connected on the secondary side of a transformer whose primary side receives high frequency oscillations modulated by the incoming data signals. On the secondary side, a rectifier demodulates the high frequency signals thereby reconsitituting the incoming data signals for transmission over the line.

BACKGROUND AND PRIOR ART

A system of the above-described type is disclosed in DE-AS No. 24 11 871. This system allows transmission of analog or digital signals over regenerating circuits which also isolate the floating transmission line from ground connections at the transmitting and receiving sides. A high transmission speed and a very exact signal regeneration without the application of special voltages can be accomplished.

In the regeneration of signals, and in particular in the regeneration of signals having relatively small amplitudes, it is important that the regenerated signal and the input data signal have a linear relationship to each other. Thus the rectification which takes place on the secondary side should have as few losses as possible. On the other hand, in the absence of signals to be regenerated, the output of the regenerating circuit should have as high an impedance as possible. This is particularly important in data transmission systems in which the transmission lines may be connected to more than one transmitting and/or receiving unit. A unit which is not in operation should present a high impedance to the transmission line to avoid changes in the characteristic impedance of the line and, further, should present a high impedance to any unit that may be in operation, so that such a unit is not overloaded.

SUMMARY OF THE INVENTION

It is an object of the present invention to furnish a regenerating circuit which allows a linear regeneration of signals having even very small amplitudes at a relatively high transmission speed and which further, when inactive, offers a very high output impedance.

In accordance with the present invention, the buffer circuit means which connects the system output terminal to the rectifier means in the presence of a control signal and disconnects it from the rectifier means in the absence of a control signal is activated by additional rectifier means which are connected to the secondary winding of the transformer and which rectify the modulated high frequency signals. The so-created rectified signals are applied to the buffer circuit means to constitute the control signals. Further, the main rectifier means is embodied in the emitter-collector circuit of a transistor. The emitter-collector circuit of another transistor constitutes the buffer circuit, the base of the latter receiving the control signals. A high frequency filter which prevents signals having a frequency exceeding a predetermined maximum frequency from reaching the signal output terminal is connected in series with the above-mentioned emitter-collector circuits.

The system in accordance with the present invention maintains the favorable characteristics of the known circuit and further causes the rectification to be substantially without ohmic loss thereby permitting very small signal amplitudes on the secondary side to be processed. Since the main rectifier is constituted by the emitter-collector circuit of a transistor, the AC signals applied to the transistor need only have an amplitude sufficient to cause the transistor to become conductive. The voltage across the secondary winding necessary for accomplishing this need only exceed the base-emitter voltage of the transistor by a small amount. The transistor operating as a rectifier generates very few losses. The buffer transistor which is connected in series with the rectifier transistor responds to control signals which are proportional to the above-mentioned rectified signals. The control signals are derived from a separate rectifier, since the signal amplitudes required to control the buffer transistor exceed the amplitudes available at the output of the main rectifier. The buffer transistor is switched to a very highly conductive state by the separately rectified signal and, in the absence of such a signal, is in a blocked state so that the output impedance of the sytem as seen from the output terminals is extremely high. Finally, a high frequency filter is provided which is connected between the transistor acting as the main rectifier and the buffer transistor so that the output of the regenerating circuit does not receive the high frequency signals. The absence of high frequency noise at the output again allows processing of signals of smaller amplitude signals.

For the transmission of binary data signals, the regenerating system has a first and second channel. Each channel has a transformer, the primary side of the first and second transformer receiving, respectively, high frequency bursts keyed by the "1" signal level and the "0" signal level. In a preferred embodiment, each channel has separate main rectifier means, buffer circuit means and filter means as discussed above. To combine the signals at the signal output terminals of the first and second channel, a load resistance is connected between the two terminals and the transmission line is then connected in parallel with the load resistance. The signals applied to the transmission line will then be bipolar signals.

The binary signals can also be combined by using separate main rectifier, buffer circuit and additional rectifier circuits but only a single filter between the main rectifier and the buffer circuits. For this purpose, one terminal of the emitter-collector circuit constituting the first main rectifier is connected to the corresponding terminal of the emitter-collector circuit constituting the second rectifier. The so-connected terminals are connected to the input of the filter, while the output of the filter is connected to the emitter-collector of the transistors serving as buffer circuits, the latter being connected in parallel to each other. In this arrangement the corresponding transistors in the two channels must be of opposite conductivity types and a separate additional rectifier circuit is provided for each channel so that each buffer circuit transistor is keyed independently of the other.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
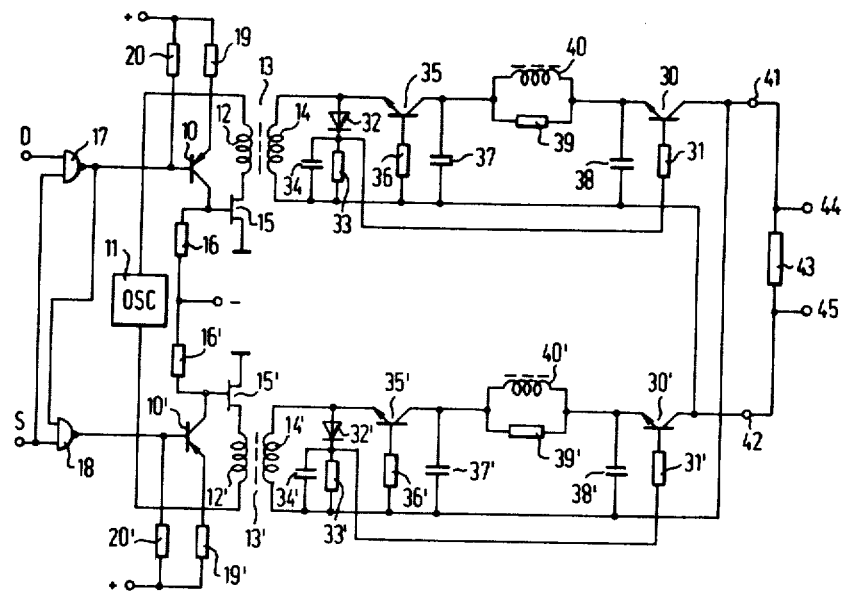
FIG. 1 is a circuit diagram of a system for regenerating binary signal.

FIG. 1 shows a signal regenerating circuit which allows the ungrounded transmission of binary data signals. The binary signals are applied to an input D which is connected to one input of a NAND gate 17. A second input S receives a transmit enable signal which is applied to one input of a NAND gate 18 as well as a second input of NAND gate 17. Data signals applied to input D are transmitted to the actual input of the regenerating circuit only in the presence of the transmit enable signal. The actual regenerating circuit includes two channels, one for each signal level of the binary signals. The first channel includes a transformer 13, the second channel a transformer 13'. The transformers have respective primary windings 12, 12' and secondary windings 14, 14'.

An oscillator 11 which generates high frequency signals is connected to the primary circuit of transformers 13 and 13'. The primary circuits, besides primary windings 12, 12' include field effect transistors 15, 15' and resistors 16, 16' connected to the gates of the respective field effect transistors to provide a negative biasing voltage thereto. Switching transistors 10, 10' each have a collector connected to the gate of the respective field effect transistor and an emitter connected through resistors 19, 19' to the positive supply line. The bases of transistors 10, 10' are connected through resistors 20, 20' respectively to the positive supply line.

On the secondary side, the emitter-collector circuit of a transistor 35, 35' is connected in series with secondary windings 14, 14' respectively. A diode 32, 32' has an anode connected to winding 14, 14' respectively and a cathode connected through a filter circuit including the parallel combination of, respectively, resistors 33, 33' and capacitors 34, 34' to the other side of windings 14, 14'. The cathode of diodes 32, 32' is connected through a resistor 31, 31' to the base of a transistor 30, 30'. The emitter-collector circuit of transistors 30, 30' constitute buffer circuit means. A high frequency filter in each channel includes, respectively, capacitors 37, 37' connected from the collector of transistors 35, 35' to the other side of windings 14, 14', a parallel circuit including a resistor 39, 39' and an inductor 40, 40' connected in series with the emitter-collector circuit of transistor 35, 35'. The filter also comprises capacitors 38, 38' connected from the emitters of transistors 30, 30' to the other side of windings 14, 14' respectively. A system output terminal 41 is connected to the collector of transistor 30 while a system output terminal 42 is connected to the collector of transistor 30'. A resistor 43 is connected from terminal 41 to terminal 42.

The above-described circuit operates as follows: If a transmit enable signal is present at terminal S and a "1" signal is applied to the D input, a "0" signal will appear at the output of NAND gate 17, while a "1" signal will appear at the output of NAND gate 18. For "0" signal at the output of NAND gate 17, transistor 10 becomes conductive, in turn causing field effect transistor 15 to become conductive. The corresponding transistors in the second channel are blocked. Thus high frequency oscillators will be transmitted through transformer 13 to secondary winding 14. The amplitude of these oscillations in such that it is somewhat higher than is required to switch transistor 35 to the conductive state. When transistor 35 becomes conductive, rectification takes place and a DC voltage builds up on capacitor 37. As mentioned above, capacitors 37, 38 as well as resistor 39 and inductor 40 constitute a high frequency blocking filter which prevents the high frequency oscillations from reaching the output.

The output of the filter is connected to the buffer circuit, namely in this case transistor 30. Because of the high frequency oscillations appearing on secondary winding 14 a DC voltage appears at the cathode of diode 32. This DC voltage is applied through base resistor 31 to the base of transistor 30 and causes it to switch to the conductive state. Thus the state of transistor 30 depends on this separately derived DC voltage. The latter is of course only present when the particular channel is active, that is when high frequency oscillations appear across secondary winding 14. In the absence of such oscillations as would, for example, be the case across winding 14' under present conditions, no DC voltage would appear at the cathode of diode 32' and transistor 30' would be in the nonconductive state effectively isolating any transmission line connected at terminals 44, 45 from the then-inactive part of the regenerating circuit. In the absence of any signal transmission through the regenerating circuit, a line connected to terminals 44 and 45 would be completely isolated from both channels, since both transistors 30 and 30' would be in the blocked state. Thus a regenerating or a repeating circuit in accordance with the present invention can be used anywhere within the transmission system since the type of isolating circuit discussed here does not load the remainder of the system when in an inactive state.

The circuit shown in FIG. 1 when used for the transmission of binary signal will generate a DC voltage having a first polarity in response to a binary "1" input and a DC signal having an opposite polarity in response to a binary "0" input.

Figure 2:
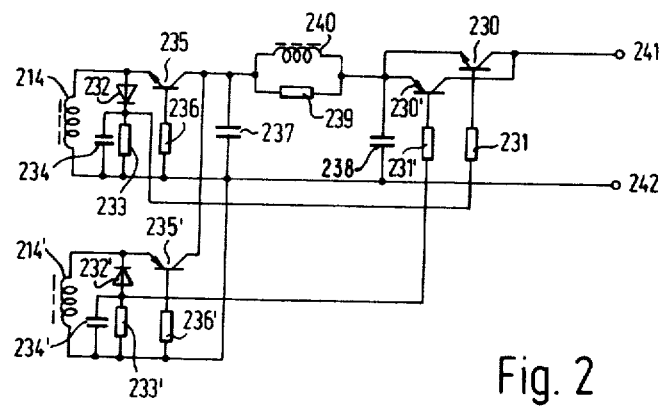
FIG. 2 is a second preferred embodiment of the circuit of FIG. 1.

FIG. 2 shows a variation of the circuit of FIG. 1 which requires only one high frequency filter. The primary circuits are the same but are not shown again. On the secondary side, the additional rectifier and its associated filter are connected as in FIG. 1, as are the transistors 235, 235' constituting the main rectifiers. However, the collector of transistor 235' is directly connected to the collector of transistor 235. The so-formed common point is directly connected to one terminal of capacitor 237 whose other terminal is connected to the other side of the secondary winding 214. One terminal of a parallel circuit including a resistor 239 and an inductor 240 is connected to capacitor 237 while its other terminal is connected to a capacitor 238. The second terminal of capacitor 238 is connected to the second terminal of capacitor 237. The common point of resistor 239 and capacitor 238 is connected to the emitter-collector circuit of a transistor 230 as well as that of a transistor 230', the emitter-collector circuits of transistors 230 and 230' being connected in parallel. Transistor 230 is an npn transistor while transistor 230' is a pnp transistor. A first system output terminal 241 is connected to a common point of the collectors of transistors 230, 230' while a second system output terminal 242 is connected to the other side of winding 214.

The above-described system operates as follows: when the high frequency oscillations appear across winding 214, a DC voltage appears at the cathode of diode 232 which causes transistor 230 to become conductive. Transistor 235 is conductive when its emitter is negative relative to its base and a negative voltage appears across capacitor 237. The DC value is transmitted to capacitor 238 and, since transistor 230 is conductive, to terminal 241. The level at terminal 241 is therefore negative with respect to that at terminal 242. For oscillations across secondary winding 214', the opposite is true. Transistors 235' is conductive when the voltage at its emitter is positive with respect to that at its base. The voltage across capacitor 237 is a positive voltage, as is the voltage across capacitor 238. Since transistor 231 will be conductive due to the proper base voltage developed at the anode of diode 232' the voltage at terminal 241 relative to that of terminal 242 will be positive voltage. Thus, similarly to the action of the circuit in FIG. 1, a DC voltage is developed between the two system output terminals, the polarity of the DC voltage varying in dependence upon the logic level at the system input.

REPRESENTATIVE VALUES AND CIRCUIT COMPONENTS USED IN THE CIRCUITS OF FIGS. 1 AND 2 ARE AS FOLLOWS

Frequency of Oscillator 11: approximately 1 megacycle
Transistors 10 and 10': BC558 (usual PNP Type)
Transistors 15 and 15': Valvo ON565
Transistors 35 and 35': BC548 (usual NPN Type)
Capacitors 37 and 37': 10 nanofarads
Capacitors 38 and 38': 10 nanofarads
Characteristic impedance of line connected at 44, 45: 150 ohms
Transistor 235: BC548 (NPN)
Transistor 235': BC558 (PNP)
Transistor 230: BC548 (NPN)
Transistor 230' : BC558 (PNP)

While the invention has been illustrated in preferred embodiments, it is not to be limited to the circuits and structures shown, since many variations thereof will be evident to one skilled in the art and are intended to be encompassed in the present invention as set forth in following claims.

I claim:

1. In a regenerating system for generating output signals at a system output terminal corresponding to data signals applied at a system input terminal, said system having transformer means having a primary and a secondary winding, means connected to said primary winding for applying thereto high frequency signals modulated by said data signals, main rectifier means connected to said secondary winding for rectifying said modulated high frequency signals, thereby creating first rectified signals constituting said output signals, and buffer circuit means having a high impedance and a low impedance in the absence and presence of a control signal, respectively: the improvement comprising
   additional rectifier means connected to said secondary winding for rectifying said modulated high frequency signals, thereby creating additional rectified signals:
   and connecting means for connecting said additional rectifier means to said buffer circuit means so that said additional rectified signals constitute said control signals.

2. A system as set forth in claim 1, wherein said main rectifier means comprises the emitter-collector circuit of a transistor.

3. A system as set forth in claim 2, further comprising filter means interconnected between said main rectifier means and said system output terminal for blocking signals having a frequency exceeding a predetermined maximum frequency from said system output terminal.

4. A system as set forth in claim 3, wherein said additional rectifier means comprises a diode connected to said secondary winding.

5. A system as set forth in claim 4, further comprising a filtering circuit connected in series with said diode.

6. A system as set forth in claim 1, having a first and second system output terminal;
   wherein said data signals are binary signals having a first and second level;
   wherein said system comprises a first and second channel; wherein said transformer means comprises first and second transformer means in said first and second channel, respectively, each of said transformer means having a primary and a secondary winding;
   wherein said means for applying high frequency signals to said primary winding comprises means for applying high frequency signals keyed by said binary signals having said first level to said primary winding of said first transformer means and means for applying high frequency signals keyed by said binary signals having said second level to said primary winding of said second transformer means;
   and wherein said main rectifier means comprises first and second main rectifier means, respectively connected to said secondary winding of said first and second transformer means.

7. A system as set forth in claim 6, wherein each of said channels further comprises said additional rectifier means and said connecting means.

8. A system as set forth in claim 7, wherein said first and second channel respectively comprise first and second high frequency filter means for blocking signals having a frequency exceeding a predetermined maximum frequency from said first and second output terminal, respectively.

9. A system as set forth in claim 7, wherein said first main rectifier means and said buffer circuit means in said first channel comprise, respectively, the emitter-collector circuit of a first and second transistor;
   wherein said second main rectifier means and said buffer circuit means in said second channel each comprises, respectively, the emitter-collector circuit of a third and fourth transistor;
   further comprising means for connecting one terminal of the emitter-collector circuit of said first transistor to one terminal of said emitter-collector circuit of said third transistor, means for connecting said emitter-collector circuit of said fourth transistor in parallel with said emitter-collector circuit of said second transistor, and filter means interconnected between the so-connected first and third and second and fourth transistors.

\* \* \* \* \*